(12) United States Patent
Guan et al.

(10) Patent No.: US 10,217,353 B2
(45) Date of Patent: Feb. 26, 2019

(54) DATA TRANSMITTING METHOD, DATA RECEIVING METHOD AND DEVICE AND SYSTEM THEREOF

(71) Applicant: BOE TECHNOLOGY GROUP CO., LTD., Beijing (CN)

(72) Inventors: Feng Guan, Beijing (CN); Zhanfeng Cao, Beijing (CN); Zhengliang Li, Beijing (CN); Qi Yao, Beijing (CN); Yaohui Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/327,412

(22) PCT Filed: Jun. 20, 2016

(86) PCT No.: PCT/CN2016/086416
§ 371 (c)(1),
(2) Date: Jan. 19, 2017

(87) PCT Pub. No.: WO2017/076005
PCT Pub. Date: May 11, 2017

(65) Prior Publication Data
US 2018/0253962 A1    Sep. 6, 2018

(30) Foreign Application Priority Data

Nov. 2, 2015  (CN) .......................... 2015 1 0732307

(51) Int. Cl.
*H04B 10/116*    (2013.01)
*G08C 23/04*    (2006.01)
(Continued)

(52) U.S. Cl.
CPC ........... *G08C 23/04* (2013.01); *G06F 3/1438* (2013.01); *H04B 10/116* (2013.01); *G05B 15/02* (2013.01)

(58) Field of Classification Search
CPC ....... G08C 23/04; G06F 3/1438; G05B 15/02; H04B 10/116
See application file for complete search history.

(56) References Cited

U.S. PATENT DOCUMENTS 7,639,849 B2 * 12/2009 Kimpe ..................... G09G 3/20
                                                      345/690
8,164,598 B2 *  4/2012 Kimpe ..................... G09G 3/20
                                                      345/629
(Continued)

FOREIGN PATENT DOCUMENTS

CN    103490812 A    1/2014
CN    103812561 A    5/2014
(Continued)

OTHER PUBLICATIONS

First Office Action for Chinese Application No. 201510732307.5, dated Nov. 24, 2017, 10 pages.
(Continued)

*Primary Examiner* — David C Payne
*Assistant Examiner* — Omar S Ismail
(74) *Attorney, Agent, or Firm* — Brooks Kushman P.C.

(57) ABSTRACT

A data transmitting method, a data receiving method and the related device and system are provided. The data transmitting device includes a display screen, a first determination module, configured to determine one or more transmitting regions of the display screen, and a transmitting module, configured to transmit, by controlling a display of the one or more transmitting regions, target data in a format of a machine language via optical signals. The data receiving device includes a panel on which a plurality of optical (Continued)

sensors is arranged, a second determination module, configured to determine one or more receiving regions of the panel each corresponding to one or more of the optical sensor, and a receiving module, configured to receive, through each optical sensor in the one or more receiving regions, target data in a format of a machine language transmitted via optical signals.

19 Claims, 3 Drawing Sheets

(51) Int. Cl.
  *G06F 3/14* (2006.01)
  *G05B 15/02* (2006.01)

(56) References Cited

U.S. PATENT DOCUMENTS

| | | | |
|---|---|---|---|
| 2009/0052902 A1* | 2/2009 | Shinokura | H04B 10/1143 398/118 |
| 2010/0225615 A1* | 9/2010 | Kurokawa | G06F 3/042 345/175 |
| 2011/0176080 A1* | 7/2011 | Toyooka | G09G 3/3651 349/41 |
| 2012/0061556 A1* | 3/2012 | Chan | G09G 3/3233 250/214 R |
| 2016/0189638 A1* | 6/2016 | de Greef | G09G 3/348 345/691 |
| 2016/0352423 A1* | 12/2016 | Tay | H04B 10/1141 |
| 2017/0193926 A1* | 7/2017 | de Greef | G09G 3/348 |

FOREIGN PATENT DOCUMENTS

| | | |
|---|---|---|
| CN | 104093191 A | 10/2014 |
| CN | 104883448 A | 9/2015 |
| CN | 105389148 A | 3/2016 |

OTHER PUBLICATIONS

International Search Report and Written Opinion for Application No. PCT/CN2016/086416, dated Sep. 19, 2016, 10 pages.

* cited by examiner

DATA TRANSMITTING METHOD, DATA RECEIVING METHOD AND DEVICE AND SYSTEM THEREOF

CROSS-REFERENCE TO RELATED APPLICATION APPLICATIONS

This application is the U.S. national phase of PCT Application No. PCT/CN2016/086416 filed on Jun. 20, 2016, which claims priority to Chinese Patent Application No. 201510732307.5 filed on Nov. 2, 2015, the disclosures of which are incorporated in their entirety by reference herein.

TECHNICAL FIELD

The present disclosure relates to the field of data transmission, and in particular to a data transmitting method, a data receiving method, a data transmitting device, a data receiving device and a data transmission system.

BACKGROUND

At present, terminal devices have become indispensable in people's daily life, and thus the data transmission between the terminal devices is particularly important.

Light Fidelity (Li-Fi) technology is a brand new wireless data transmission technology. By the Li-Fi technology, data is transmitted by use of light emitted by a light source, thereby achieving a single-direction, fast and secure data transmission.

The technical issue of how to apply the Li-Fi technology to the terminal device to achieve a fast and secure data transmission is needed to be solved.

SUMMARY

An object of the present disclosure is to provide a Li-Fi data transmission solution achieved by a terminal device provided with a display screen, so as to achieve a secure and fast data transmission.

To achieve the above object, a data transmitting device is provided in the present disclosure, including: a display screen; a first determination module, configured to determine one or more transmitting regions of the display screen; and a transmitting module, configured to transmit, by controlling the one or more transmitting regions, target data in a format of a machine language via optical signals.

Optionally, each of the one or more transmitting regions corresponds to one or more sub-pixels of the display screen, and the transmitting module is configured to transmit, by controlling a display grayscale of each sub-pixel of the one or more transmitting regions, the target data in the format of the machine language via the optical signals.

Optionally, the machine language is a binary language, and the transmitting module includes: a compiling sub-module, configured to convert the target data into a format of a binary language defined by a light-emitting state and a lighting-off state of each sub-pixel of the one or more transmitting regions; and a transmitting sub-module, configured to control each sub-pixel of the one or more transmitting regions to emit light or be lighted off based on the converted target data.

Optionally, the machine language is a denary language, and the transmitting module includes: a compiling sub-module, configured to convert the target data into a format of a denary language defined by ten levels of the display grayscales of each sub-pixel of the one or more transmitting regions; and a transmitting sub-module, configured to control, based on the converted target data, each sub-pixel of the one or more transmitting regions to emit light in accordance with a corresponding display grayscale.

Optionally, the data transmitting device is a mobile phone or a tablet computer.

A data receiving device is further provided in the present disclosure, including: a panel provided with a plurality of optical sensors; a second determination module, configured to determine one or more receiving regions of the panel each corresponding to one or more of the optical sensors; and a receiving module, configured to receive, through each optical sensor in the one or more receiving regions, target data in a format of a machine language transmitted via optical signals.

Optionally, the receiving module includes: a control sub-module, configured to control each optical sensor in the one or more receiving regions to receive the optical signals, where each optical sensor in the one or more receiving regions is configured to generate corresponding electrical signals after receiving the optical signals; and a converting sub-module, configured to determine the target data in the format of the machine language based on the electrical signals generated by each optical sensor in the one or more receiving regions.

Optionally, each of the plurality of optical sensors includes a photosensitive transistor and a switch transistor, a source electrode and a drain electrode of the switch transistor are electrically connected to an output electrode of the photosensitive transistor and an input end of the converting sub-module respectively, and a gate electrode of the switch transistor is electrically connected to an output end of the control sub-module.

Optionally, the converting sub-module is further configured to determine the target data in the format of the machine language based on a state of generating the electrical signals and a state of generating no electrical signal of each optical sensor in the one or more receiving regions.

Optionally, the converting sub-module is further configured to determine the target data in the format of the machine language based on ten different voltages of the electrical signals received by each optical sensor in the one or more receiving regions.

A data transmitting method applied to a display screen is further provided in the present disclosure, including: determining one or more transmitting regions of the display screen; and transmitting, by controlling the one or more transmitting regions, target data in a format of a machine language via optical signals.

Optionally, each of the one or more transmitting regions corresponds to one or more sub-pixels of the display screen. The transmitting, by controlling a display of the one or more transmitting regions of the display screen, target data in a format of a machine language via optical signals includes: transmitting, by controlling a display grayscale of each sub-pixel of the one or more transmitting regions, the target data in the format of the machine language via the optical signals.

Optionally, the machine language is a binary language, and the transmitting, by controlling a display grayscale of each sub-pixel of the one or more transmitting regions, the target data in the format of the machine language via the optical signals includes: converting the target data into a format of the binary language defined by a light-emitting state and a lighting-off state of each sub-pixel of the one or more transmitting regions; and controlling each sub-pixel of the one or more transmitting regions to emit light or be lighted off based on the converted target data.

Optionally, the machine language is a denary language, and the transmitting, by controlling a display grayscale of each sub-pixel of the one or more transmitting regions, the target data in the format of the machine language via the optical signals includes: converting the target data into a format of a denary language defined by ten levels of the display grayscales of each sub-pixel of the one or more transmitting regions; and controlling, based on the converted target data, each sub-pixel of the one or more transmitting regions to emit light in accordance with a corresponding display grayscale.

A data receiving method applied to a data receiving device is further provided in the present disclosure, where the data receiving device includes a panel provided with a plurality of optical sensors, and the data receiving method includes: determining one or more receiving regions of the panel each corresponding to one or more of the optical sensors; and receiving, through each optical sensor in the one or more receiving regions, target data in a format of a machine language transmitted via optical signals.

Optionally, the receiving, through each optical sensor in the one or more receiving regions, target data in a format of a machine language transmitted via optical signals includes: controlling each optical sensor in the one or more receiving regions to receive the optical signals, where each optical sensor in the one or more receiving regions generates corresponding electrical signals after receiving the optical signals; and determining the target data in the format of the machine language based on the electrical signals generated by each optical sensor in the one or more receiving regions.

Optionally, the determining the target data in the format of the machine language based on the electrical signals generated by each optical sensor in the one or more receiving regions includes: determining the target data in the format of the machine language based on a state of generating the electrical signals and a state of generating no electrical signal of each optical sensor in the one or more receiving regions.

Optionally, the determining the target data in the format of the machine language based on the electrical signals generated by each optical sensor in the one or more receiving regions includes: determining the target data in the format of the machine language based on ten different voltages of the electrical signals received by each optical sensor in the one or more receiving regions.

A data transmission system is further provided in the present disclosure, including the data transmitting device hereinabove and the data receiving device hereinabove.

The beneficial effects of the technical solution may be as follows. According to the present disclosure, the display screen is divided into a plurality of transmitting regions, and each transmitting region is controlled accurately to display, so as to transmit the target data via optical signals. Such optical signal may be received effectively merely in a direction perpendicular to the display screen, so the optical signals are difficult to be captured and of a high security accordingly.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. The following drawings are for illustration purpose only, and not necessarily shown to be in scales based on the actual size.

REFERENCE SIGNS

11—display screen; 111—transmitting region; 12—first determination module; 13—transmitting module; 21—panel; 211—optical sensor; 212—optical sensor; 22—second determination module; 23—receiving module; 31—photosensitive transistor; 32—switch transistor; 33—gate line; 34—data line; 41—light—transmitting material layer; 42—upper electrode; 43—lower electrode; 44—insulation layer; 51—mobile phone; 52—data receiving device.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
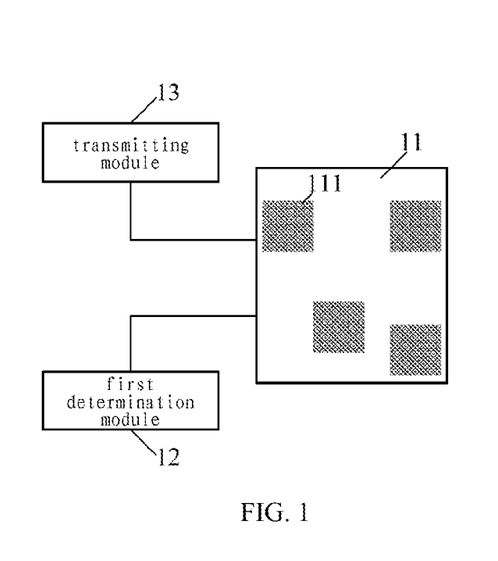
FIG. 1 is a schematic view of a data transmitting device in the present disclosure.

As shown in FIG. 1, a data transmitting device is provided in the present disclosure, including: a display screen 111; a first determination module 12, configured to determine one or more transmitting regions 111 of the display screen 11; and a transmitting module 13, configured to transmit, by controlling the one or more transmitting regions 111, target data in a format of a machine language via optical signals.

It should be noted that, the machine language is a language appropriate for a machine to read, such as the binary language, the denary language and so on. The video playing or the like for a user or a camera device through the transmitting regions 11 does not belong to the data transmission solution of the present disclosure.

According to the embodiments of the present disclosure, the display screen is divided into a plurality of transmitting regions, and each transmitting region is controlled accurately to display, so as to transmit the target data in the format of the machine language via optical signals. Since such optical signal may be received effectively merely in a direction perpendicular to the display screen, so it is difficult for a nearby device to capture the optical signals, and the transmission of the optical signals is of a high security accordingly. In addition, the data transmitting device in the embodiments of the present disclosure may be a terminal device with a screen on the market such as a mobile phone or a PAD, therefore the device may be widely used and have a high practicability.

Furthermore, the display screen emits light by taking the sub-pixels as the reference units thereof. Therefore, in the embodiments of the present disclosure, the number of the transmitting regions and the size of each transmitting region may be determined based on the number of the sub-pixels of the transmitting regions.

In some embodiments of the present disclosure, for example, each transmitting region includes one sub-pixel. In the case that each sub-pixel of the entire display region includes a respective one transmitting region, a transmission with a maximum bandwidth may be achieved. Taking a mobile phone at present as an example, a screen thereof having a resolution not less than 1280×720 is commonly provided with a large number of sub-pixels. A unit display frame only lasts for several milliseconds or a dozen of milliseconds, so the sub-pixels may function to display at a frequency which cannot be identified by human eyes, thereby achieving a very high transmission rate.

Alternatively, in some embodiments of the present disclosure, each transmitting region includes a plurality of sub-pixels, such that the transmitting regions of the screen may occupy a relative large area and the data receiving device may be allowed to have lower identification accuracy for light.

Correspondingly, the transmitting module may transmit, by controlling a display grayscale of each sub-pixel of the transmitting regions, the target data in the format of the machine language via the optical signals of different brightness. The following description is made conjunction with the embodiments.

In some embodiments of the present disclosure, "1" represents a light-emitting state of the light transmitting region, and "0" represents a lighting-off state of the light transmitting region, so as to achieve a binary optical signal transmission.

In some embodiments of the present disclosure, the transmitting module includes: a compiling sub-module, configured to convert the target data into a format of the binary language defined by a light-emitting state and a lighting-off state of each sub-pixel of the transmitting regions; and a transmitting sub-module, configured to control each sub-pixel of the transmitting regions to emit light or to be lighted off based on the converted target data.

According to the embodiments of the present disclosure, the transmitting region is controlled to emit light and be turned off in different image frames respectively, thereby transmitting binary data via optical signals. Of course, the above solution merely illustrates the data transmission via optical signals. Alternatively, the target data may be converted into a format of the machine language denoted by the different levels of the display grayscales of the transmitting regions. For example, the machine language may be a denary language, and then the transmitting regions may emit light in accordance with ten levels of display grayscales, and the detailed description thereof is omitted herein.

Figure 2:
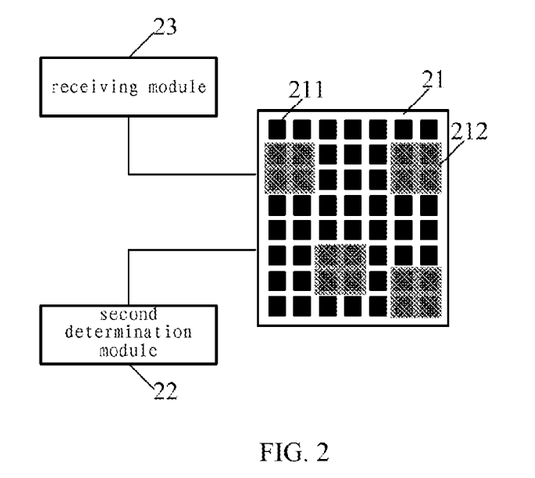
FIG. 2 is a schematic view of a data receiving device in the present disclosure.

Corresponding to the data transmitting device hereinabove, a data receiving device is further provided in some embodiments of the present disclosure. As shown in FIG. 2, the data receiving device includes: a panel 21 provided with a plurality of optical sensors 211; a second determination module 22, configured to determine one or more receiving regions 212 of the panel 21 each corresponding to one or more of the optical sensors 211; and a receiving module 23, configured to receive, through each optical sensor of the receiving regions 212, target data in a format of a machine language transmitted via optical signals.

According to the embodiment of the present disclosure, the panel provided with a plurality of optical sensors serves as the data receiving device, and the panel is provided with the receiving regions corresponding to the transmitting regions hereinabove, thereby the machine language data transmitted from the transmitting regions via optical signals are received through the one or more optical sensors of each receiving region.

To be specific, the optical sensor in the present disclosure may be a photoelectric converter capable of converting the optical signals from the data transmitting device into electrical signals, and then the final target data may be determined based on the electrical signals.

In other words, the receiving module includes: a control sub-module, configured to control each optical sensor in the one or more receiving regions to receive the optical signals, where each optical sensor in the one or more receiving regions generates corresponding electrical signals after receiving the optical signals; and a converting sub-module, configured to determine the target data in the format of the machine language based on the electrical signals generated by each optical sensor in the one or more receiving regions.

Next, a process of converting the optical signals into the target data may be described in the following.

Figure 3:
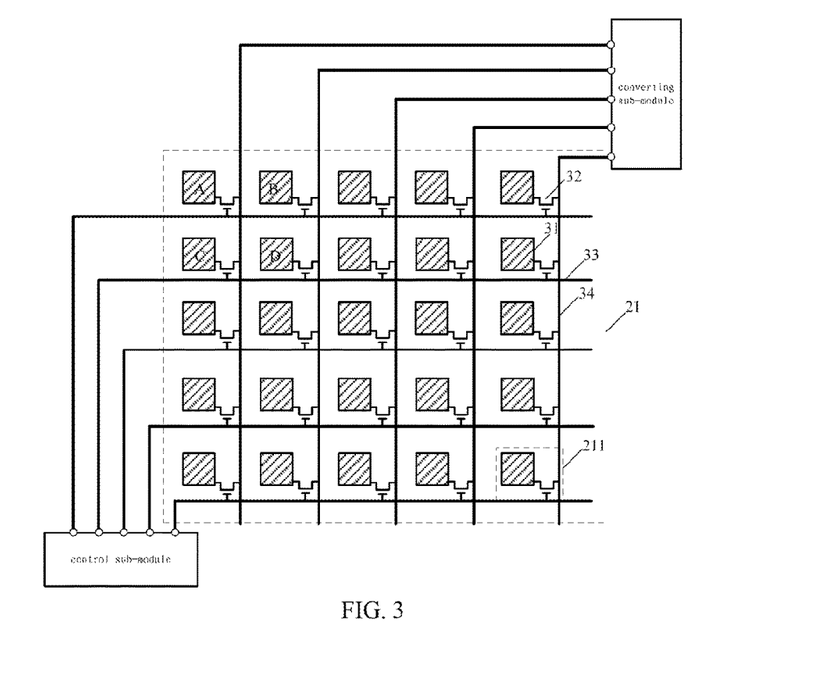
FIGS. 3 and 4 are detailed schematic views of a data receiving device in the present disclosure.

To be specific, as shown in FIG. 3, an array of the optical sensors 211 in some embodiments is arranged evenly on the panel 21, and each optical sensor 211 includes a photosensitive transistor 31 and a switch transistor 32.

On one hand, connection ends of the switch transistor 32, i.e., a source electrode and a drain electrode thereof, are electrically connected to an output electrode of the photosensitive transistor 31 and a data line 34 respectively, and data line 34 is further electrically connected to an input end of the converting sub-module hereinabove. On the other hand, a control end of the switch transistor 32, i.e., a gate electrode thereof, is electrically connected to an output end of the control sub-module hereinabove via a gate line 33.

It can be seen from FIG. 3, the control sub-module in some embodiments of the present disclosure may control the turn-on and turn-off of the switch transistors 32 via the gate lines 33, thereby to enable the electrical connections between the photosensitive transistors 31 and the converting sub-module or cut off the electrical connections therebetween.

For example, assuming that each receiving region in FIG. 3 corresponds to four photosensitive transistors A, B, C and D, and the control sub-module turns on the switch transistors corresponding the photosensitive transistors A, B, C and D via the first and second rows of gate lines. Then, the converting sub-module receives electrical signals generated by the photosensitive transistors A, B, C and D via the first and second columns of data lines to determine the target data.

Taking an example that binary data is transmitted via optical signals, by the converting sub-module determines that the binary language code "1" is received in the case that the corresponding photosensitive transistor of the receiving region generates an electric current, or the receiving sub-module determines that the binary language code "0" is received in the case that the corresponding photosensitive transistor of the receiving region generates no electric current, thereby to determine the target data.

In addition, in a practical application, similar as the terminal device on the market, the data receiving device in some embodiments of the present disclosure may be of a plate structure. That is, the photosensitive transistors and the switch transistors hereinabove are arranged on the panel by layers.

Next, the multi-layer structure of the data receiving device in some embodiments of the present disclosure may de described in details in the following.

Figure 4:
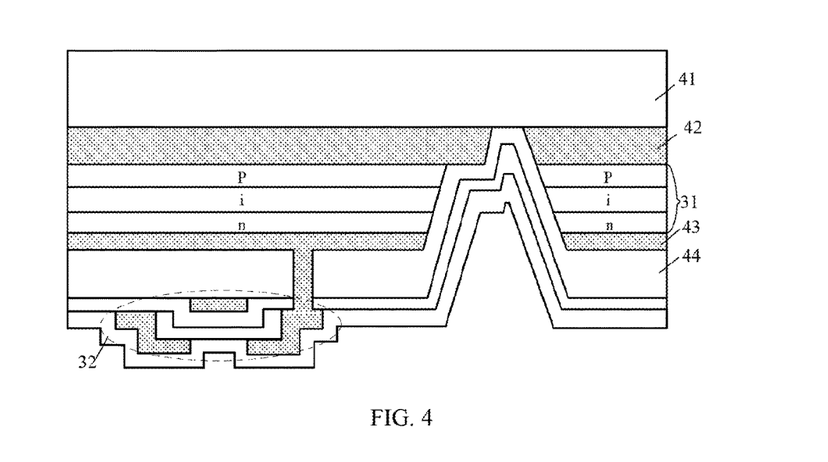

As shown in FIG. 4, the panel in some embodiments of the present disclosure includes a non-opaque material layer 41, and the photosensitive transistor 31 hereinabove is a PIN junction photosensitive thin film transistor (or a PN junction photosensitive thin film transistor, and the description thereof is omitted herein) arranged at an inner side of the non-opaque material layer 41.

To be specific, an upper electrode 42 of the PIN type photosensitive thin film transistor 31 is arranged below the non-opaque material layer 41, and the upper electrode 42 is a transparent conductive oxide thin film and may be made of a transparent conductive oxide such as indium tin oxide (ITO), indium zinc oxide (IZO) or benzodiazepine (BZO). In order to collect the photovoltaic current more effectively, a lower electrode 43 is further arranged below the PIN type photosensitive thin film transistor 31, and the lower electrode 43 may be a transparent conductive oxide thin film or a sputtered metal conductive layer. An insulation layer 44 is further arranged below the lower electrode 43, which may be made of a material such as silicon nitride or silicon oxide. Furthermore, a thin film transistor 32 (i.e., the switch transistor 32) is arranged below the insulation layer.

It should be noted that, as shown in FIG. 4, it is merely taken as example that the thin film transistor 32 is arranged below the PIN type photosensitive thin film transistor 31. Alternatively, both the thin film transistor 32 and the PN type photosensitive transistor 31 may be arranged at a same plane, and the detailed description thereof is omitted herein.

Next, a practical application of the data transmission via optical signals may be described in details in conjunction with the data transmitting device and the data receiving device in the present disclosure.

Figure 5:
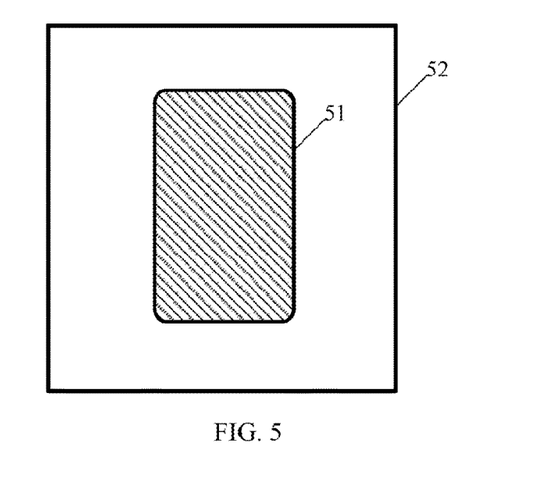
FIG. 5 is a schematic view of a data transmission between a data transmitting device and a data receiving device in the present disclosure.

For example, a mobile phone serves as a data transmission device, as shown in FIG. 5, a user may put a display screen of the mobile phone 51 to be in contact with a panel of the data receiving device 52.

Then, a communication between the mobile phone and the data receiving device is established to achieve a matching of the data transmission, including: determining a quantity and relative positions of the transmitting regions and the receiving regions, where the transmitting regions of the screen of the mobile phone are in one-to-one correspondence to the receiving regions of the panel of the data receiving device, and positions of the transmitting regions and the receiving regions may overlap with each other; determining target data transmission mode by which the mobile phone and the data receiving device are matched with each other. For example, the transmitting regions may be arranged in order, and the target data is divided into multiple pieces of sub-data, and then the multiple pieces of subdata are distributed to the respective transmitting regions in order so as to transmit the same. Then, after receiving the multiple pieces of sub-data, the data receiving device reproduces the target data by combining the multiple pieces of subdata in order based on the correspondence of the receiving regions and the transmitting regions.

To be specific, an identical piece of testing data may be preset for the mobile phone and the data receiving device. In the process of matching the mobile phone and the data receiving device, the mobile phone sends the testing data to the data receiving device. Then, the matching may be determined to be successful in the case that the data receiving device identifies the testing data sent by the mobile phone successfully.

After the matching is completed, the target data may be transmitted, including: the mobile phone converting through a program control the target data into codes indicating turn-on and turn-off states of the sub-pixels of the transmitting regions and performing the display; generating corresponding electrical signals in the case that optical signals are sensed by the optical sensors of the receiving regions of the panel; and decoding the electrical signals and reproducing the target data based on the electrical signals, through a program control.

In the transmission process hereinabove, the display screen of the mobile phone and the panel of the data receiving device are in contact with each other face to face, so a third party device cannot steal the transmitted signals, thereby achieving an absolutely secure transmission. In addition, the data receiving device in some embodiments may be a device capable of storing data, such as mobile hark disk and a computer, and the user may transmit big data fast by the personal terminal device.

Based on the solutions hereinabove, a data transmission system including the data transmitting device and the data receiving device hereinabove is further provided in the present disclosure, and the data transmission system is capable of transmitting data in a fast and secure manner based on the Li-Fi technology.

Figure 6:
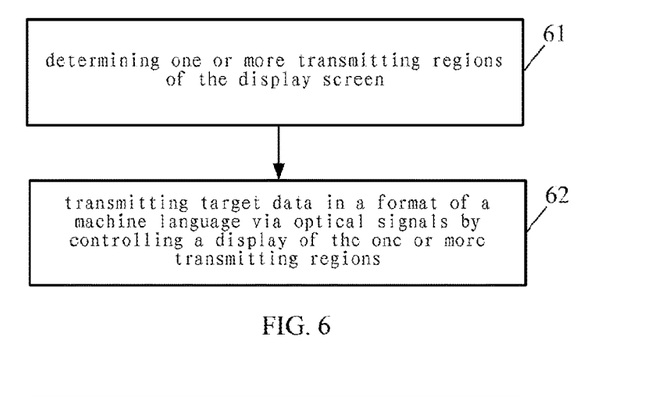
FIG. 6 is a flow chart of a data transmitting method in the present disclosure.

In addition, a data transmitting method applied to a display screen is further provided in some embodiments of the present disclosure, including:

step 61: determining one or more transmitting regions of the display screen; and step 62: transmitting target data via optical signals by controlling a display of the one or more transmitting regions, wherein each transmitting region corresponds to one or more sub-pixels of the display screen.

In the above Step 61, the target data in the format of the machine language is transmitted via the optical signals by controlling a display grayscale of each sub-pixel of the one or more transmitting regions.

Taking an example that the machine language is a binary language, the target data is converted into a format of the binary language codes "1" and "0" defined by a light-emitting state and a lighting-off state of each sub-pixel of the one or more transmitting regions. Then, each sub-pixel of the one or more transmitting regions is controlled to emit light or be lighted off based on the converted target data, so as to transmit the binary target data via the optical signals.

Obviously, the data transmitting method in the above embodiment corresponds to the data transmitting device hereinabove, and the data transmitting method and device may achieve the same technical effect.

Figure 7:
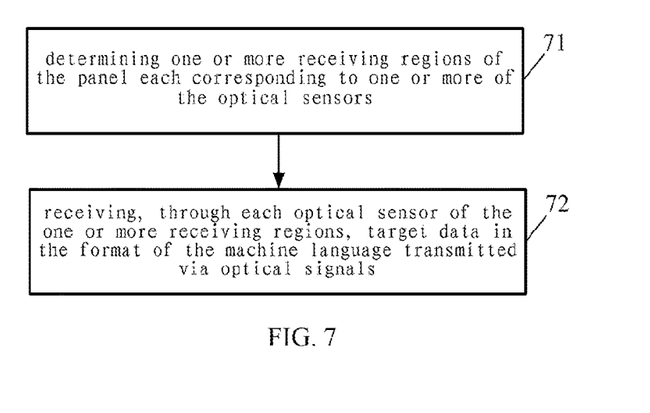
FIG. 7 is a flow chart of a data receiving method in the present disclosure.

In addition, a data receiving method applied to the data receiving device hereinabove is further provided in some embodiments of the present disclosure, including:

step 71: determining one or more receiving regions of the panel each corresponding to one or more of the optical sensors; and step 72: receiving, through each optical sensor in the one or more receiving regions, target data in a format of a machine language transmitted via optical signals.

According to the data receiving method hereinabove, the panel provided with a plurality of optical sensors serves as the data receiving device, and the panel is provided with the receiving regions corresponding to the transmitting regions hereinabove, thereby the optical signal data transmitted from the transmitting regions are received through the one or more optical sensors of each receiving region.

To be specific, corresponding to the data transmitting method hereinabove, the target data may be reproduced by the received optical signals through the data receiving method.

In the case that the machine language in the above embodiment is a binary language, the step 72 hereinabove may further include:

step 721: controlling each optical sensor in the one or more receiving regions to receive the optical signals, where each optical sensor in the one or more receiving regions generates corresponding electrical signals after receiving the optical signals; and step 722: determining the target data based on the electrical signals generated by each optical sensor in the one or more receiving regions.

To be specific, the step 722 further includes determining the target data in the format of the machine language based on a state of generating the electrical signals and a state of generating no electrical signal of each optical sensor in the one or more receiving regions.

Obviously, the data receiving method in the above embodiment corresponds to the data receiving device hereinabove, and the data receiving method and device may achieve the same technical effect.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A data transmitting device, comprising:
a display screen;
a first determination circuit, configured to determine one or more transmitting regions of the display screen; and
a transmitting circuit, configured to transmit, by controlling the one or more transmitting regions, target data in a format of a machine language via optical signals,
wherein each of the one or more transmitting regions corresponds to at least two sub-pixels of the display screen; and
the transmitting circuit is configured to transmit, by controlling a display grayscale of each sub-pixel in the one or more transmitting regions, the target data in the format of the machine language via the optical signals, wherein display grayscales of the at least two sub-pixels corresponding to any one of the one or more transmitting regions are same.

2. The data transmitting device according to claim 1, wherein
the machine language is a binary language, and the transmitting circuit comprises:
a compiling sub-circuit, configured to convert the target data into a format of a binary language defined by a light-emitting state and a lighting-off state of each sub-pixel in the one or more transmitting regions; and
a transmitting sub-circuit, configured to control each sub-pixel in the one or more transmitting regions to emit light or be lighted off based on the converted target data.

3. The data transmitting device according to claim 1, wherein
the machine language is a denary language, and the transmitting circuit comprises:
a compiling sub-circuit, configured to convert the target data into a format of a denary language defined by ten levels of display grayscales of each sub-pixel in the one or more transmitting regions; and
a transmitting sub-circuit, configured to control, based on the converted target data, each sub-pixel in the one or more transmitting regions to emit light in accordance with a corresponding display grayscale.

4. The data transmitting device according to claim 1, wherein the data transmitting device is a mobile phone or a tablet computer.

5. A data receiving device, comprising:
a panel on which a plurality of optical sensors is arranged;
a second determination circuit, configured to determine one or more receiving regions of the panel each corresponding to one or more of the optical sensors; and
a receiving circuit, configured to receive, through each optical sensor in the one or more receiving regions, target data in a format of a machine language transmitted from one or more transmitting regions of a display screen of a data transmitting device via optical signals, wherein the one or more transmitting regions correspond to the one or more receiving regions in a one-to-one manner,
wherein the receiving circuit comprises:
a control sub-circuit, configured to control each optical sensor in the one or more receiving regions to identify a display grayscale of each sub-pixel in the one or more transmitting regions, to receive the optical signals, wherein each optical sensor in the one or more receiving regions is configured to generate corresponding electrical signals after receiving the optical signals, each of the one or more transmitting regions corresponds to at least two sub-pixels of the display screen, and display grayscales of the at least two sub-pixels corresponding to any one of the one or more transmitting regions are same.

6. The data receiving device according to claim 5, wherein the receiving circuit further comprises:
a converting sub-circuit, configured to determine the target data in the format of the machine language based on the electrical signals generated by each optical sensor in the one or more receiving regions.

7. The data receiving device according to claim 6, wherein each of the plurality of optical sensors comprises:
a photosensitive transistor and a switch transistor, wherein a source electrode and a drain electrode of the switch transistor are electrically connected to an output electrode of the photosensitive transistor and an input end of the converting sub-circuit respectively, and a gate electrode of the switch transistor is electrically connected to an output end of the converting sub-circuit.

8. The data receiving device according to claim 6, wherein the converting sub-circuit is further configured to determine the target data in the format of the machine language based on a state of generating the electrical signals and a state of generating no electrical signal of each optical sensor in the one or more receiving regions.

9. The data receiving device according to claim 6, wherein the converting sub-circuit is further configured to determine the target data in the format of the machine language based on ten different voltages of the electrical signals received by each optical sensor in the one or more receiving regions.

10. A data transmitting method applied to the display screen of the data transmitting device according to claim 1, comprising:
   determining the one or more transmitting regions of the display screen; and
   transmitting, by controlling the one or more transmitting regions, the target data in the format of the machine language via the optical signals.

11. The method according to claim 10, wherein
   each of the one or more transmitting regions corresponds to at least two sub-pixels of the display screen;
   the transmitting, by controlling a display of the one or more transmitting regions of the display screen, target data in a format of a machine language via optical signals comprises:
   transmitting, by controlling a display grayscale of each sub-pixel in the one or more transmitting regions, the target data in the format of the machine language via the optical signals.

12. The method according to claim 11, wherein
   the machine language is a binary language, and the transmitting, by controlling a display grayscale of each sub-pixel in the one or more transmitting regions, the target data in the format of the machine language via the optical signals comprises:
   converting the target data into a format of a binary language defined by a light-emitting state and a lighting-off state of each sub-pixel in the one or more transmitting regions; and
   controlling each sub-pixel in the one or more transmitting regions to emit light or be lighted off based on the converted target data.

13. The method according to claim 11, wherein
   the machine language is a denary language, and the transmitting, by controlling a display grayscale of each sub-pixel in the one or more transmitting regions, the target data in the format of the machine language via the optical signals comprises:
   converting the target data into a format of a denary language defined by ten levels of the display grayscales of each sub-pixel in the one or more transmitting regions; and
   controlling, based on the converted target data, each sub-pixel in the one or more transmitting regions to emit light in accordance with a corresponding display grayscale.

14. A data receiving method applied to the data receiving device according to claim 5, wherein the data receiving method comprises:
   determining the one or more receiving regions of the panel each corresponding to the one or more of the optical sensors; and
   receiving, through each optical sensor in the one or more receiving regions, the target data in the format of the machine language transmitted via the optical signals.

15. The method according to claim 14, wherein
   the receiving, through each optical sensor in the one or more receiving regions, target data in a format of a machine language transmitted via optical signals comprises:
   controlling each optical sensor in the one or more receiving regions to receive the optical signals, wherein each optical sensor in the one or more receiving regions generates corresponding electrical signals after receiving the optical signals; and
   determining the target data in the format of the machine language based on the electrical signals generated by each optical sensor in the one or more receiving regions.

16. The method according to claim 15, wherein
   the determining the target data in the format of the machine language based on the electrical signals generated by each optical sensor in the one or more receiving regions comprises:
   determining the target data in the format of the machine language based on a state of generating the electrical signals and a state of generating no electrical signal of each optical sensor in the one or more receiving regions.

17. The method according to claim 15, wherein
   the determining the target data in the format of the machine language based on the electrical signals generated by each optical sensor in the one or more receiving regions comprises:
   determining the target data in the format of the machine language based on ten different voltages of the electrical signals received by each optical sensor in the one or more receiving regions.

18. A data transmission system, comprising the data transmitting device according to claim 1 and a data receiving device.

19. The data transmission system according to claim 18, wherein the data receiving device comprises:
   a panel on which a plurality of optical sensors is arranged;
   a second determination circuit, configured to determine one or more receiving regions of the panel each corresponding to one or more of the optical sensors; and
   a receiving circuit, configured to receive, through each optical sensor in the one or more receiving regions, target data in a format of a machine language transmitted via optical signals.

* * * * *